United States Patent [19]

Italiano

[11] 4,323,907
[45] Apr. 6, 1982

[54] VALVE FOR INK JET PRINTER

[75] Inventor: Victor J. Italiano, Ithaca, N.Y.

[73] Assignee: NCR Corporation, Dayton, Ohio

[21] Appl. No.: 108,984

[22] Filed: Jan. 2, 1980

[51] Int. Cl.³ .............................................. G01D 15/18
[52] U.S. Cl. ................................. 346/140 R; 137/38
[58] Field of Search .......................... 346/140; 137/38

[56] References Cited

U.S. PATENT DOCUMENTS

| | | | |
|---|---|---|---|
| 3,100,495 | 8/1963 | Boler | 137/38 |
| 3,327,315 | 6/1967 | Felton | 346/140 |
| 3,747,120 | 7/1973 | Stemme | 346/140 X |
| 3,771,165 | 11/1973 | Kurimoto | 346/140 |
| 3,787,884 | 1/1974 | Demer | 346/140 X |
| 4,223,323 | 9/1980 | Bader | 346/140 |

OTHER PUBLICATIONS

Hendriks et al., Pressure Surge Annihilator for Ink Jet Heads; *IBM TDB* vol. 21, No. 12, May 1979, pp. 5062-5063.

*Primary Examiner*—Joseph W. Hartary
*Attorney, Agent, or Firm*—J. T. Cavender; Wilbert Hawk, Jr.; George J. Muckenthaler

[57] ABSTRACT

A valve member is positioned in an ink cavity carried by a bidirectionally movable print head and is operable to open and close the inlet and the outlet of the cavity to minimize fluctuations of the ink due to acceleration and deceleration of the print head.

15 Claims, 3 Drawing Figures

VALVE FOR INK JET PRINTER

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been obtaining and maintaining the required control of the printing operation. As is well-known, the impact printing operation depends upon the movement of impact members typically by reason of an electromechanical system which is believed to enable a more precise control of such impact members.

The advent of non-impact printing as in the case of thermal printing brought out the fact that the heating cycle must be controlled in a manner to obtain maximum repeated operations. Likewise, the control of ink jet printing must deal with the problem of rapid starting and stopping movement of the ink fluid from a supply of such fluid in order to minimize fluctuations thereof during print head reversal in direction of movement.

Representative prior art in the field of ink jet printing includes U.S. Pat. No. 3,747,120, issued to N. G. E. Stemme on July 17, 1973, which discloses an arrangement of writing mechanisms for applying droplets of ink in liquid form to a surface and wherein a chamber is divided into an inner portion and an outer portion with a channel connecting the portions. The chamber inner portion is provided with a piezoelectric device for producing short duration pressure increases in the fluid within the chamber and an intake or supply channel is connected with the chamber outer portion for transmission of the fluid through a discharge channel.

U.S. Pat. No. 3,946,398, issued to E. L. Kyser et al. on Mar. 23, 1976, discloses method and apparatus for recording with writing fluids and droplet projection means wherein a print head includes a piezoelectric crystal plate connected with a membrane and charged with a voltage pulse which causes the crystal plate and the membrane to bend and to produce pressure oscillations in an ink-filled liquid chamber of the print head. Upon each occurrence of a first maximum pressure in the liquid, an ink droplet is ejected through a nozzle and deposited on a record medium. In order to insure a safe release of the ink droplet at a sufficient initial speed, the crystal must be charged with a voltage pulse of sufficient height and width to bring about a respective maximum pressure in the liquid. A minimum pressure follows the maximum pressure in the liquid chamber and the chamber is again filled with ink so that by the following energization pulse of the crystal plate, a sufficient maximum pressure is produced which causes the next ink droplet to be ejected from the nozzle.

U.S. Pat. No. 4,074,284, issued to J. L. Dexter et al. on Feb. 14, 1978, discloses means for metering the flow of ink to the print head which includes a pressure sensor and a valve integrally incorporated into the print head. The pressure sensor detects changes in the fluid pressure in a pulse trap chamber and operates the valve to allow ink to flow to the pulse trap chamber upon the reduction of pressure below a predetermined level which is less than the maximum capillary pressure capable of being generated at the print head nozzles. The valve allows the maintenance of a substantially constant fluid pressure in the pulse trap chamber of the print head which feeds ink to the individual droplet ejection chambers. The pressure sensor and valve control system automatically compensates for the variations in the pressure of the high pressure source as the elastic force becomes less with removal of significant volumes of ink.

U.S. Pat. No. 4,125,845, issued to R. G. Stevenson on Nov. 14, 1978, discloses ink jet print head pressure and temperature control circuits wherein ink pressure within a pulse trap chamber is maintained within fixed limits by means of a first strain gauge connected for generating a signal proportional to the pressure of ink within the chamber and a second strain gauge utilized for temperature compensation of the pressure reading obtained from the first strain gauge. A valve operated by an electrical signal controls whether the ink passage into the chamber from an ink container is opened or closed.

U.S. application Ser. No. 159,414, filed June 13, 1980, which is a continuation-in-part application of Ser. No. 969,902, filed Dec. 15, 1978 by L. Bader et al., now abandoned, and assigned to the assignee hereof, discloses an ink jet control wherein a membrane is maintained by a drive element in a tensioned state for a delayed time such that negative or under-pressure resulting from release of the drive element occurs either after or prior to the minimum pressure following the maximum pressure. The system utilizes capillary forces and the relaxation of a piezoelectric crystal to supply ink to the reciprocating print head from a stationary reservoir which is open or vented to the atmosphere. The ink in the print head and the supply line is caused to be accelerated and decelerated during reverse or turnaround of the print head, thereby causing the ink to tend to be then forced out of the print head nozzle and/or air to be sucked into the print head through the nozzle. Either of these conditions may cause failure of the ink jet print head to operate properly.

While such ink movement problem can be controlled in one manner by supplying the ink to the print head at a relatively high pressure and using a sensor and a valve to control the ink pressure in the print head as per the disclosure in Dexter et al. U.S. Pat. No. 4,074,284 mentioned above, such technique involves the supplying of means to attain the high ink pressure in addition to the control valve and also an expensive sensing device.

Additionally, U.S. application Ser. No. 969,903, likewise filed Dec. 15, 1978 by L. Bader et al., now Pat. No. 4,223,323 issued Sept. 16, 1980, and assigned to the assignee hereof, discloses a plurality of printing elements connected by movable supply lines to an ink supply and disposed to maintain a small angle of ink flow when the print head moves from side to side. A secondary reservoir on the moving print head reduces fluctuations of the ink meniscus in the print head nozzle due to acceleration and deceleration of the print head by trapping a small volume of air in the supply line to partially dampen the motion of the fluid.

SUMMARY OF THE INVENTION

The present invention relates to ink jet printing and more particularly to a printer having one or more print heads or elements which are arranged on a carriage caused to be moved or reciprocated in a side-to-side direction across the printer transverse to the direction of travel of a record medium. The print heads or elements are individually and equally spaced on the carriage and each element has an ink supply line connected thereto and directed downwardly at substantially a right angle to the direction of movement of the carriage.

Means is provided for dealing with wave-like movement of the ink due to acceleration and deceleration of the print head carriage by installing valve means in the ink supply line leading from an ink supply to the print heads. Such valve means includes a movable member which is sensitive to acceleration and deceleration of the print heads and carriage at turnaround or reversal thereof when moving in a reciprocating manner. The print heads are supplied with ink through individual lines from a manifold in the ink supply line. One embodiment of the invention employs a valve means which includes a chamber or cavity with inlet and outlet ports and a ball member within the chamber and movable from a center position to one of two spaced positions, one position being where the ball member is seated at the inlet port and the other position wherein the ball member is seated at the outlet port. The lower surface of the cavity is spherical in shape to support the ball in the center position and to provide a path for movement of the ball from one port to the other port in the operation of the valve means to minimize ink fluctuations.

A second embodiment of the invention employs a valve means which includes the use of a pair of sensitive springs to provide the force necessary to restore a movable plunger member to the open or center position at the time when the print heads are operating at a constant velocity.

In view of the above discussion, the principal object of the present invention is to provide an ink jet recording device with a maintained and even flow of ink to the nozzles of the print heads thereof.

Another object of the present invention is to provide control means in an ink jet recording device for preventing undesirable oscillations of ink through the print heads and onto the record medium.

An additional object of the present invention is to provide valve means in an arrangement to prevent formation of air bubbles in the recording device.

A further object of the present invention is to provide valve means in the ink supply to the print heads of an ink jet printer to substantially reduce or eliminate undesirable movement of the ink due to acceleration and deceleration of the print heads.

Additional advantages and features of the present invention will become apparent and fully understood from a reading of the following description taken together with the annexed drawing.

DESCRIPTION OF THE PREFERRED EMBODIMENT

Figure 1:
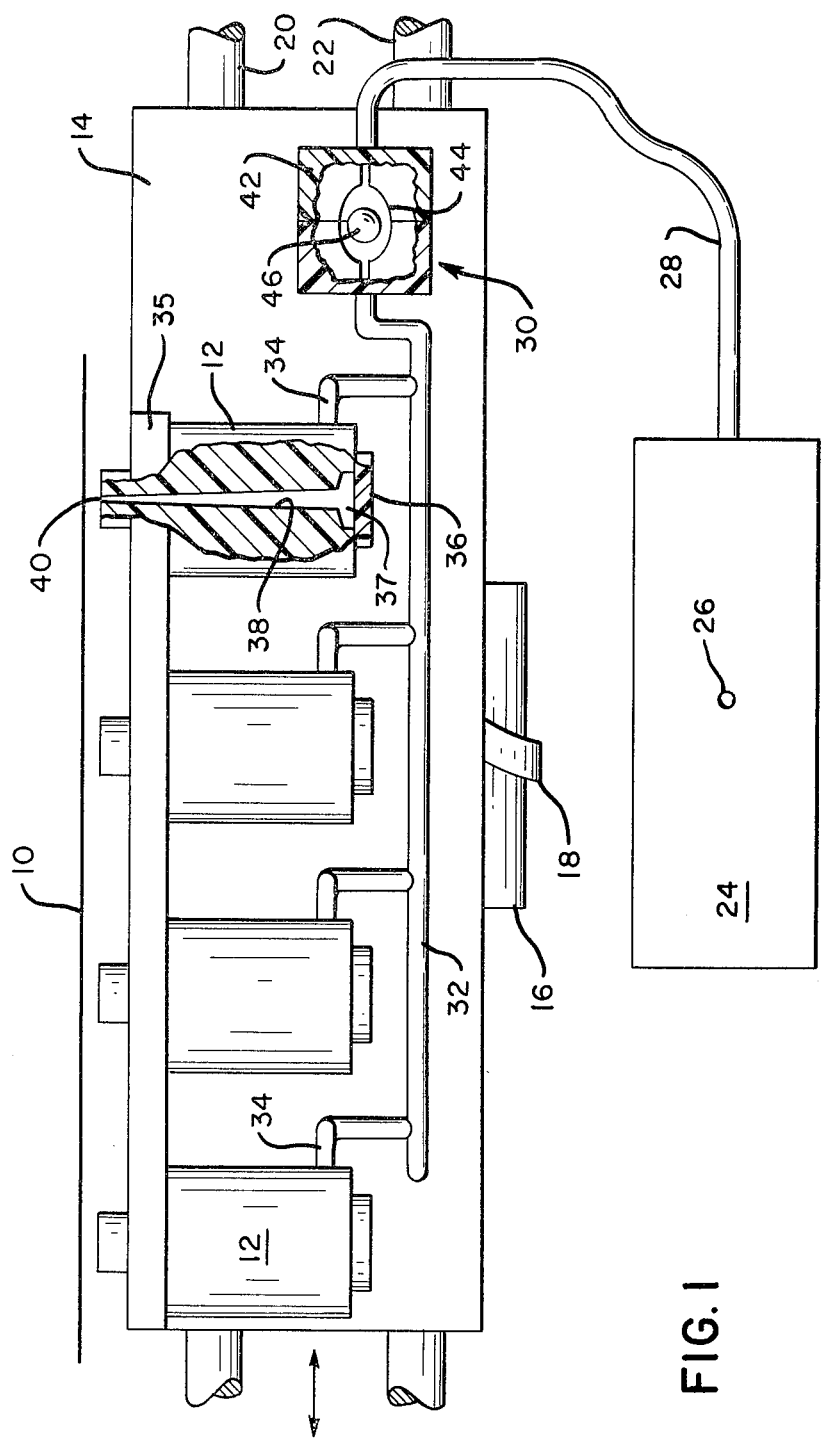
FIG. 1 is a top plan view in partial section of a portion of an ink jet printer incorporating the subject matter of the present invention.

Referring to FIG. 1, there is shown a simplified diagrammatic representation of a portion of an ink jet printer which incorporates the subject matter of the present invention. A record medium or paper 10 is caused to be driven by drive means (not shown) past a printing station or line of printing adjacent and formed by the position of a plurality of ink jet print elements or heads 12, which print heads 12 are supported from and carried by a carriage 14 which is caused to be driven in oscillating or reciprocating side-to-side movement by means of a drum cam 16 having a rail 18 operably engaged with the carriage 14 in well-known manner. A pair of spaced rails or shafts 20 and 22 carried by the printer support the carriage 14 in its side-to-side movement.

An ink supply is contained in a stationary reservoir 24 having a vent 26 and ink is caused to be transported from the reservoir 24 through a flexible conduit or like passageway 28 to valve means 30. The ink flows from the valve means 30 into a manifold 32 and then through individual lines 34 to the respective print heads 12.

The print heads 12 are held in secure manner on the carriage 14 by a support member 35 maintaining same along a straight line for printing a line of dots. Each print head 12 includes a piezoelectric crystal or like drive element 36 for driving ink from an ink chamber 37 through a passageway 38 in the print head 12 and out a nozzle 40 to deposit droplets of ink onto the paper 10. The operation of the print head drive element 36 is well-known in the art, however, suffice it to say that the chamber 37 is filled with ink and energization of the piezoelectric element 36 causes a pulsating motion in pumping the ink through the passageway 38 and out the nozzle 40.

As illustrated in FIG. 1, such valve means 30 is installed between the supply line 28 and the manifold 32 and includes a body 42 having a cavity 44 containing a ball 46 of proper mass and freely movable within the cavity. As further illustrated in FIG. 2, the valve 30 includes an ink inlet port 48 connected with the supply line 28 and an ink outlet port 50 connected with the manifold 32. The cavity 44 also has a low portion which subjects the ball member 46 to the force of gravity and provides a center position for the ball.

Construction of the valve means 30 may preferably comprise two pieces in a molding process including molding a lower portion 52 and an upper left portion 54 in one piece and molding an upper right portion 56 in a second piece. After ball member 46 is placed in the cavity 44, the portion 56 may then be welded by ultrasonic or like means to portions 52, 54. Suffice it to say that other ways and means may be used to make up the valve assembly 30.

Figure 2:
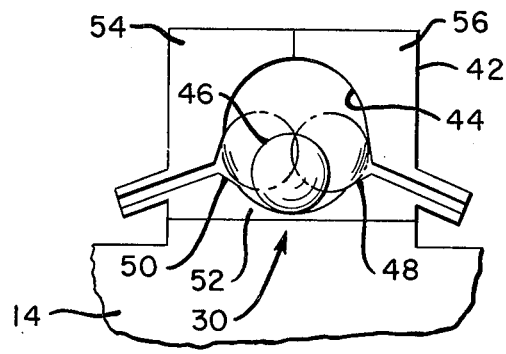
FIG. 2 is an enlarged side view of the valve means as shown in FIG. 1.

In the operation of the preferred valve means 30, the ball 46 member will be in the center position, as seen in FIG. 2, when the carriage 14 along with the print heads 12 are being moved in side-to-side manner. Assuming that the print heads 12 are moving from left to right, the ball 46, upon deceleration of the carriage 14 at the right side of the printer, is caused to move to the right by reason of its inertia and seat over the inlet port 48, as shown by the phantom line position of the ball member 46, thus sealing the port 48 and shutting off the flow of ink from the reservoir 24 into the cavity 44. After the carriage 14 has reached the right side and reverses direction to move toward the left, i.e. in a carriage 14 and print head 12 turnaround motion, the acceleration in the leftward direction causes the ball 46 to be held in the seated position until the printing speed is reached, whereupon the ball 46 will roll toward the center or low position of the cavity 44 by reason of gravity. Then, as the carriage 14 approaches the left side, the deceleration thereof causes the ball 46 to move to the left due to its inertia and seat over the outlet port 50, as again shown by the phantom line position of the ball member 46, thus sealing the port 50 and shutting off the flow of ink from the cavity 44 into the manifold 32. After the carriage 14 has reached the left side and reverses direction to move toward the right, again in the print head 12 turnaround motion, the acceleration in the rightward direction holds the ball 46 in the seated position until the printing speed is reached, whereupon the ball 46 again rolls toward the center position of the cavity 44 by reason of gravity.

Figure 3:
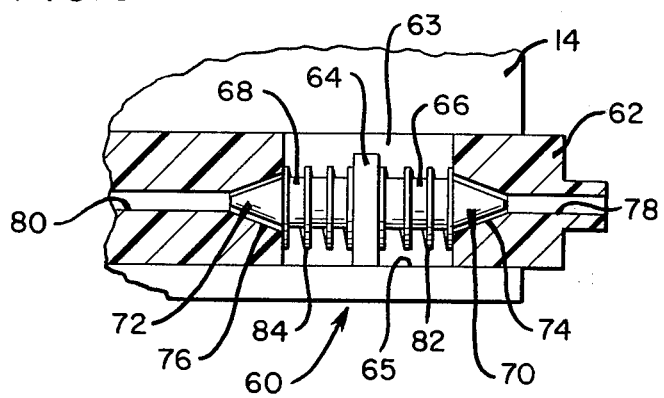
FIG. 3 is an enlarged side view of a modification of valve means for use in the present invention.

A modified valve means or assembly 60 shown in FIG. 3 may be utilized in a printer environment less sensitive to being level and wherein the carriage 14 supports a body 62 having a cavity 63 containing a movable plunger member 64. The plunger member 64 may include a square-formed washer or plate having a flat side for moving along a lower surface 65 of the body 62. As illustrated, the member 64 includes identical right and left side portions 66 and 68 which are circular in shape and which terminate in right and left cone portions 70 and 72, respectively. Cone portion 70 fits with a right side conical opening 74 formed in the body 62 and cone portion 72 fits with a left side conical opening 76 formed in the body 62. The right side opening 74 connects with an inlet port 78 of the body 62, in turn connected with the ink supply tube 28, and the left side opening 76 connects with an outlet port 80 of the body 62, in turn connected with the manifold 32.

Light springs 82 and 84 encircle the respective right and left side portions 66 and 68 to provide a force necessary to restore and maintain the movable plunger member 64 at the central position permitting ink flow between the supply tube 28 and the manifold 32 during the time of printing when the carriage 14 is moving at a constant velocity and when neither acceleration or deceleration is taking place. In a manner similar to that described above for the preferred valve means 30, movement of the plunger member 64 to the right and left for closing off the respective inlet and outlet ports 78 and 80 takes place automatically as inertial forces resulting from acceleration and deceleration of the carriage 14 causes the plunger member 64 to overcome the associated springs 82 and 84 accordingly. In this modification of the invention, the plunger and spring ratios can easily be changed for accommodating various peak acceleration loads.

It is thus seen that herein shown and disclosed is an ink jet printer having valve means positioned in the path of the flow of ink which is subjected to the acceleration and deceleration of the print heads and which valve means is effective to control the flow of ink during bidirectional printing movement. The valve means includes a member which is freely movable in a cavity by reason of the inertial forces thereon to open and close the inlet and outlet ports of the body of the valve means. The valve means enables the accomplishment of the objects and advantages mentioned above, and while a preferred embodiment of the invention and a modification thereof have been disclosed, it is contemplated that all such variations and modifications not departing from the spirit and scope of the invention hereof are to be construed in accordance with the following claims.

I claim:

1. A control system for an ink jet print head movable in bidirectional printing manner and having ink drive means for ejecting an ink droplet through a nozzle in the print head, said system comprising a
   stationary ink reservoir, an
   ink supply line connected with said ink reservoir and with said print head, and
   valve means having an inlet port and an outlet port and movable with said print head and interposed in said ink supply line and responsive upon acceleration and deceleration of said print head to open and close said ports wherein said ink supply line is closed on one side of said valve means when said print head is decelerated and accelerated at one end of travel, and said ink supply line is closed on the other side of said valve means when said print head is decelerated and accelerated at the other end of travel of the print head by reason of the inertial forces acting on said valve means, and said ink supply line is open on both sides of said valve means from the reservoir to the print head during printing operation when said print head is moving at printing speed.

2. The control system of claim 1 including a plurality of print heads and an ink supply line connected with each of said print heads and movable therewith.

3. The control system of claim 1 wherein said valve means comprises a valve body having a cavity therein and an element movable from a center position thereof within said cavity to open and close said ink supply line.

4. The control system of claim 1 wherein said valve means comprises a valve body having a spherical-shaped cavity therein and a ball movable from a center position thereof to open and close said ink supply line.

5. The control system of claim 1 wherein said valve means comprises a valve body having a cavity therein and an element movable by inertial force to close said ink supply line and resiliently urged to open said ink supply line.

6. A valve assembly for controlling the flow of ink to an ink jet print head movable in side-to-side direction on a printer having an ink reservoir and a supply line connecting said reservoir and said print head, said valve assembly comprising a
   valve body interposed in said supply line and having an inlet port and an outlet port, a
   cavity within said valve body connecting said ports and having a center position therebetween, and
   means movable within said cavity and responsive to acceleration and deceleration of said print head wherein said inlet port is closed when said print head is decelerated and accelerated at one end of travel, and said outlet port is closed when said print head is decelerated and accelerated at the other end of travel, and said inlet port and said outlet port are open to permit flow of ink in the line from the reservoir to the print head during movement of said print head in the side-to-side direction when said movable means is at the center position.

7. The valve assembly of claim 6 including a plurality of print heads and wherein said ink supply line is connected with each of said print heads and movable therewith.

8. The valve assembly of claim 6 wherein said valve body cavity is spherical-shaped and said movable means therewithin comprises a ball member movable from said center position of said cavity to open and close said ports.

9. The valve assembly of claim 6 wherein said movable means within said valve body cavity comprises an element movable by inertial force to close one of said ports and resiliently urged to open said one port.

10. The valve assembly of claim 6 wherein said inlet port and said outlet port of said cavity are cone shaped and said movable element includes conical end portions for mating with said ports.

11. In an ink jet printer having a print head movable in transverse direction, a stationary ink reservoir, a line for supplying ink from said reservoir to said print head, and ink flow control means interposed in said line comprising a body member movable with said print head, a cavity within said body member and having an inlet connected with said reservoir, an outlet connected with said print head, and a center position between the inlet and the outlet, and a movable member within said cavity and responsive to acceleration and deceleration of said print head for closing said inlet when said print head is decelerated and accelerated at one end of travel thereof, and for closing said outlet when said print head is decelerated and accelerated at the other end of travel thereof, and for maintaining said inlet and said outlet open to permit flow of ink in the supply line from the reservoir to the print head during movement of said print head in the transverse direction when said movable member is at the center position.

12. In the printer of claim 11 including a plurality of print heads and wherein said ink supply line connects with said print heads and is movable therewith.

13. In the printer of claim 11, wherein said body member cavity is spherical-shaped and said movable member comprises a ball movable therewithin from said center position of said cavity to open and close said inlet and said outlet.

14. In the printer of claim 11 wherein said movable member comprises a plunger element movable within said cavity by inertial force to close said inlet and resiliently urged to open said inlet in one direction of travel of said print head.

15. In the printer of claim 11 wherein said cavity inlet and outlet are cone shaped and said movable member includes conical-shaped end portions for mating with said inlet and outlet.

* * * * *